L. M. KEECH.
ANTISKIDDING DEVICE FOR AUTOMOBILES.
APPLICATION FILED OCT. 25, 1912.
1,091,142.
Patented Mar. 24, 1914.
2 SHEETS—SHEET 1.
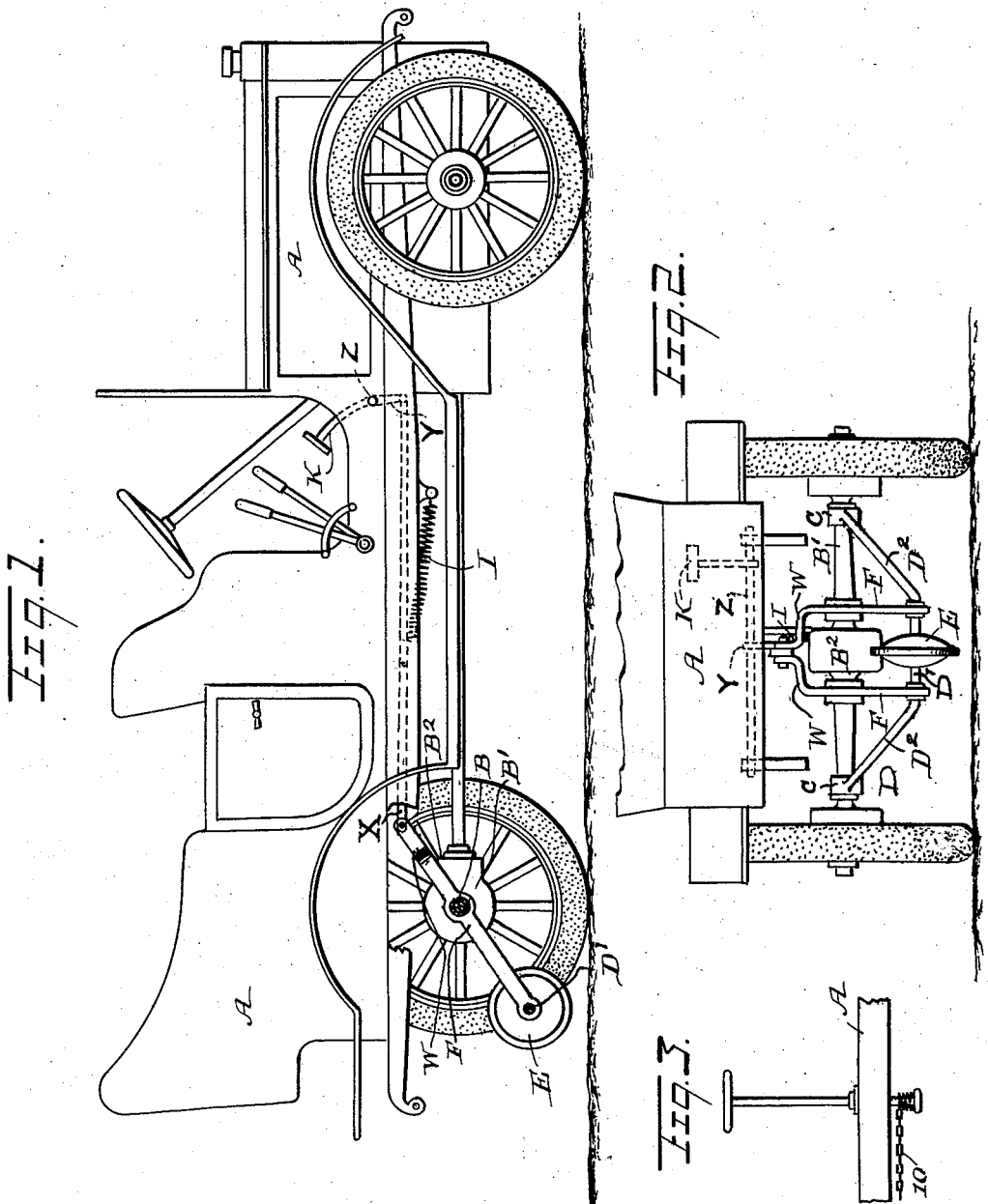
WITNESSES:
INVENTOR
Lyman M. Keech
BY
F. N. Gilbert
ATTORNEY

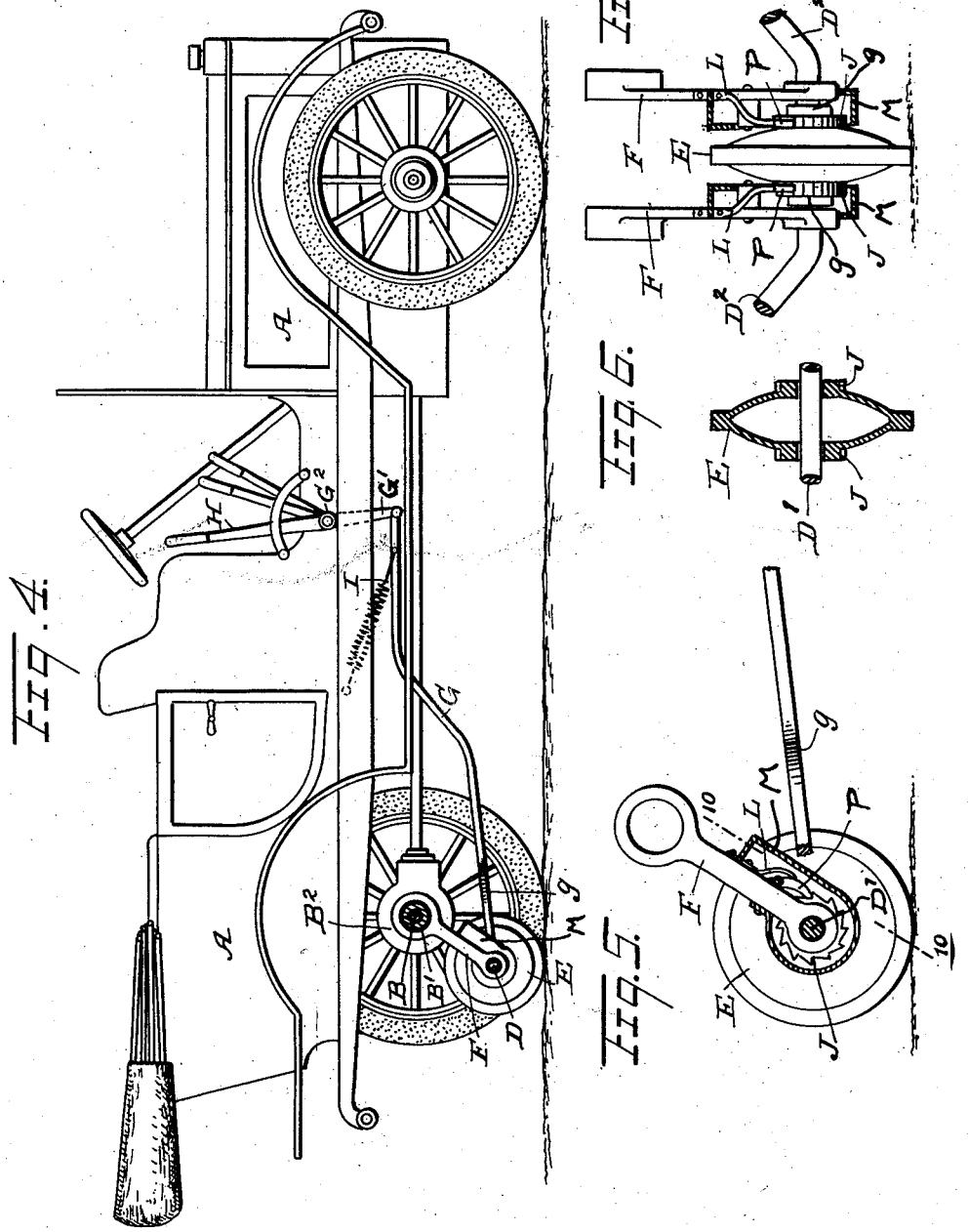

UNITED STATES PATENT OFFICE.

LYMAN M. KEECH, OF HARPURSVILLE, NEW YORK.

ANTISKIDDING DEVICE FOR AUTOMOBILES.

1,091,142.

Specification of Letters Patent. Patented Mar. 24, 1914.

Application filed October 25, 1912. Serial No. 727,661.

*To all whom it may concern:*

Be it known that I, LYMAN M. KEECH, a citizen of the United States, residing at Harpursville, in the county of Broome and State of New York, have invented certain new and useful Improvements in Antiskidding Devices for Automobiles, of which the following is a specification.

This invention relates to a novel device to prevent the skidding of automobiles and similar vehicles, of the type that is carried by the rear of the vehicle, and adapted to be automatically thrown into engagement with the ground to prevent the machine from twisting from its course when traveling over slippery ground.

The object of the invention is to provide a simple, durable and practical device that can be carried on the chassis of a vehicle, and upon being brought into service will cut into surface of the road and prevent lateral movement of the rear of the vehicle.

Another object of the invention is to provide a device which will not only prevent the lateral accidental movement of the car, but will check the backward movement thereof also. This is an important asset to a device of this character, since it acts as an emergency brake to prevent the vehicle accidentally descending an incline backward.

With the above and other objects in view, which will more readily appear as the nature of the invention is better understood, the same consists in the novel construction, combination and arrangement of parts hereinafter more fully described, illustrated and claimed.

A preferred and practical embodiment of the invention is shown in the accompanying drawings, in which:—

Figure 1 is a side elevation of a vehicle, partly in section, showing the application of one form of my invention. Fig. 2 is a rear view of a vehicle also showing the application of my invention. Fig. 3 is a detail view of a modified form of turn handle for operating my device. Fig. 4 is a view similar to Fig. 1 showing a modified form of my invention. Fig. 5 is an enlarged detail view partly in section, showing the disk wheel provided with pawl and ratchet mechanism. Fig. 6 is a cross section of the disk shown in Fig. 5. Fig. 7 is a sectional view taken on the line 10—10 of Fig. 5.

Similar reference characters designate corresponding parts throughout the several figures of the drawings.

Referring specifically to the structure disclosed in the drawings, A designates the body of a vehicle and chassis, which has the usual rear axle B, inclosed in the axle casing B', and also the usual gear box B².

In the form of the invention shown in Figs. 1 and 2 it will be seen that on each side of the said gear box B² and on the axle casing B', are pivotally mounted the swinging lever arms F F whose upper portions extend above the axle as indicated at W and are pivotally clamped on each side of the operating rod X which is connected to the lever Y on the transverse shaft Z, which has fixed thereto a pedal K. The lower portions of said arms are adapted to receive the straight intermediate axle portion D' of the shaft member D whose side extensions D² extend upwardly and are clamped, or otherwise movably attached to the axle casing B' at C. The side extensions of the shaft D being pivotally mounted on the axle casing B', and concentric with the pivotal points of the arms F F, constitute a swinging bracket that is well braced to withstand lateral strains. Upon the axle portion D' of the shaft D, the disk E is rotatably mounted, the said disk E being the part of this device that comes into contact with the ground and serves practically the same function to the vehicle upon which it is mounted, as a rudder does to a ship. A spring I connected to the rod X and the body of the machine holds the device in its normal inoperative position, and to throw it into operation the pedal K is pushed forward.

Fig. 3 illustrates another means for forcing the wheel E into the road-bed, and that is by drawing either of the rods G or X forward by a chain 10.

In the form of the invention shown in Fig. 4 the manipulation of the device is made possible by the operating rod G which is forked as at g—g. The said forked portion of the rod G is pivotally connected to the axle portion D' of the shaft D, and the opposite end of the said rod is connected to the lever G' depending from the transverse shaft G², which has connected therewith the hand lever H. In connection with this form of the invention it will be observed that the same is normally always out of service, that is, the disk E is held out of contact with the ground by the spring I. When it becomes necessary to use the device the hand lever H is pulled toward the operator, thus forcing the disk E into the surface of the road bed, through the medium of the rod G moving forward and pulling the axle portion D' on which E is mounted, downwardly.

It often happens that the brakes on a vehicle refuse to work when the latter is climbing a hill, and it is necessary to have some brake for the emergency other than those usually found on the machine. The present device in contemplation of this, provides, in addition to the features already pointed out, the disk E with a double series of ratchet teeth J J, as shown in Fig. 5. To the arms F F are pivoted the pawls P P, the same being forced into engagement with the ratchets J J by the pressure springs L L as shown in Figs. 5 and 7. The said pawl and ratchet mechanisms, inclosed in the casings M M thus permit the disk E to turn only the same way the wheels of the vehicle do, and upon being brought into use in an emergency, prevent the machine from traveling backward.

From the foregoing specification, it is believed that the advantages and objects of the invention will be readily apparent without further description.

I claim:

A device of the character described comprising in combination with the vehicle body and the rear axle casing, a bracket member including a pair of spaced apart lever arms pivotally connected at one end to the intermediate part of said axle casing, a shaft connecting the lever arms at the ends opposite their connection with the axle casing and carrying a disk wheel, arm extensions connected to the lever arms at their lower ends and being pivotally connected to the axle casing at their opposite ends, an operating rod having a pivotal connection with said bracket and yieldingly connected to the vehicle body to hold the bracket normally inoperative, and means for rendering the device operative.

In testimony whereof I have affixed my signature in presence of two witnesses.

LYMAN M. KEECH.

Witnesses:
N. B. WILLIAMS,
S. A. VALENTINE.